July 16, 1957     R. BERLINE     2,799,397
PRESSURE FILTERS
Filed Dec. 23, 1953     3 Sheets-Sheet 1
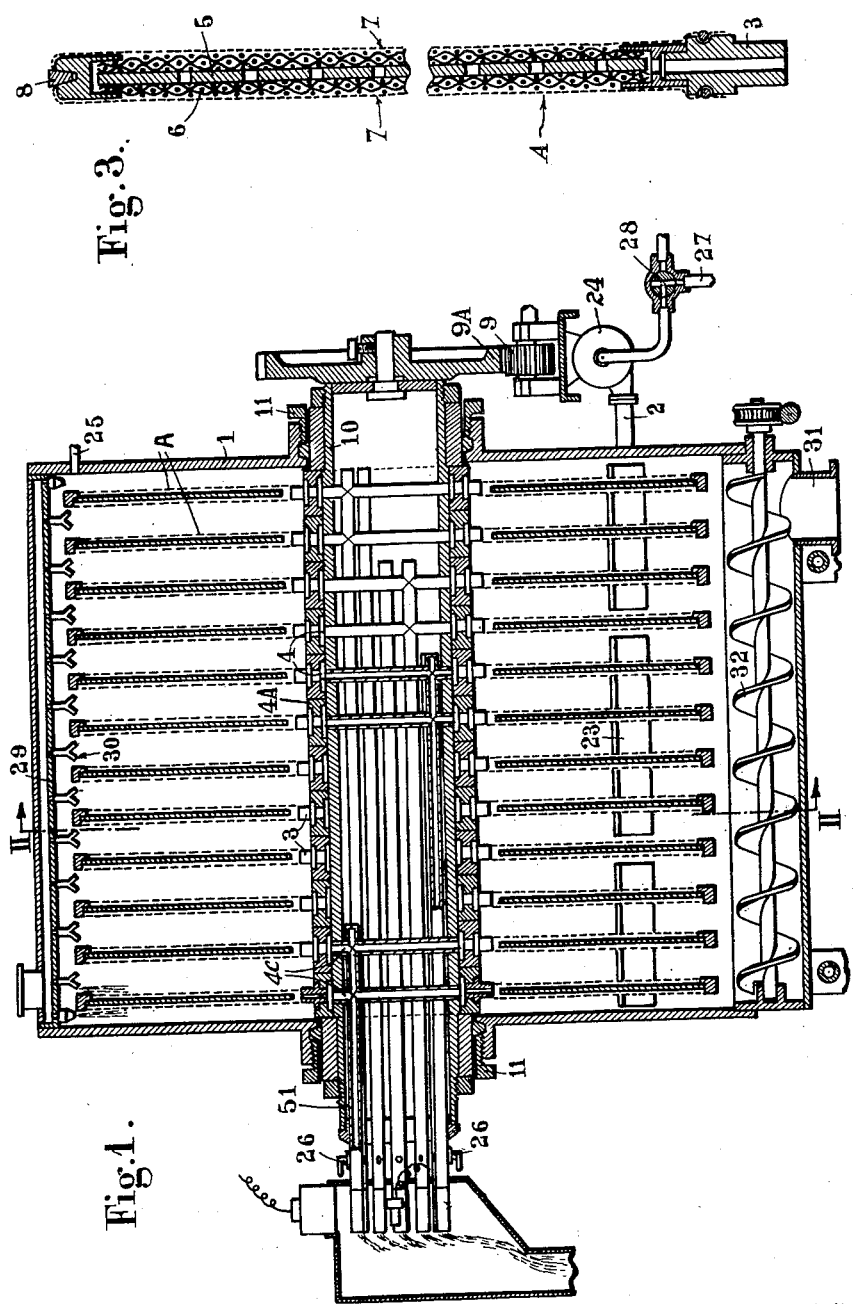
INVENTOR
RAOUL BERLINE
Ostrolenk + Faber
ATTORNEYS

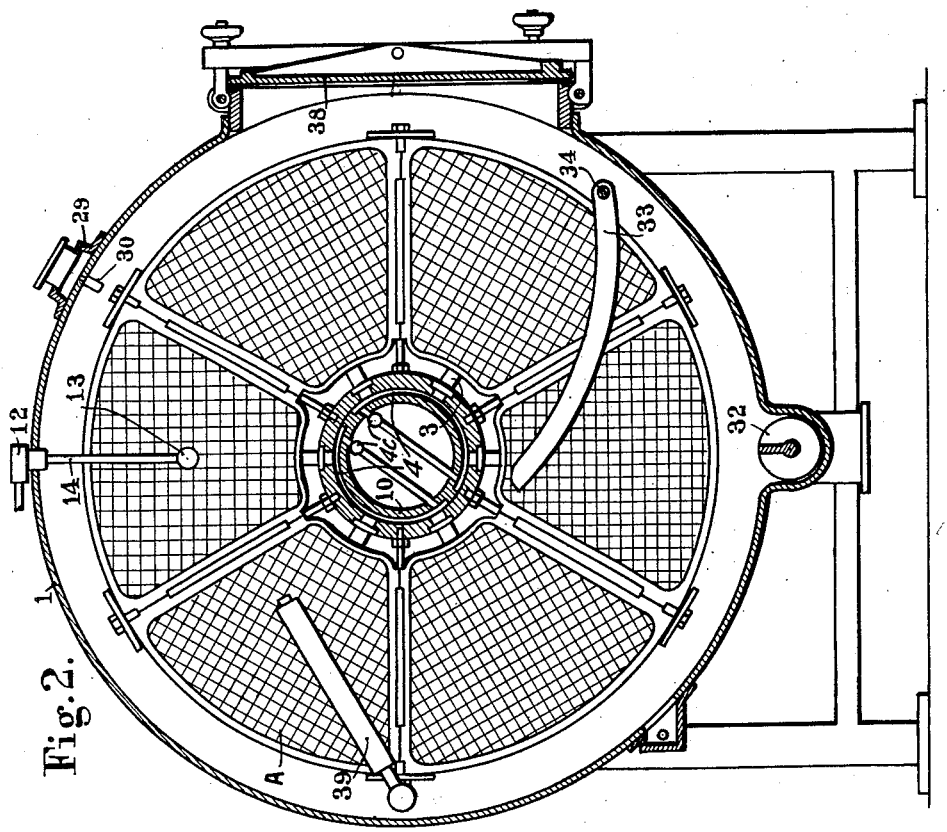
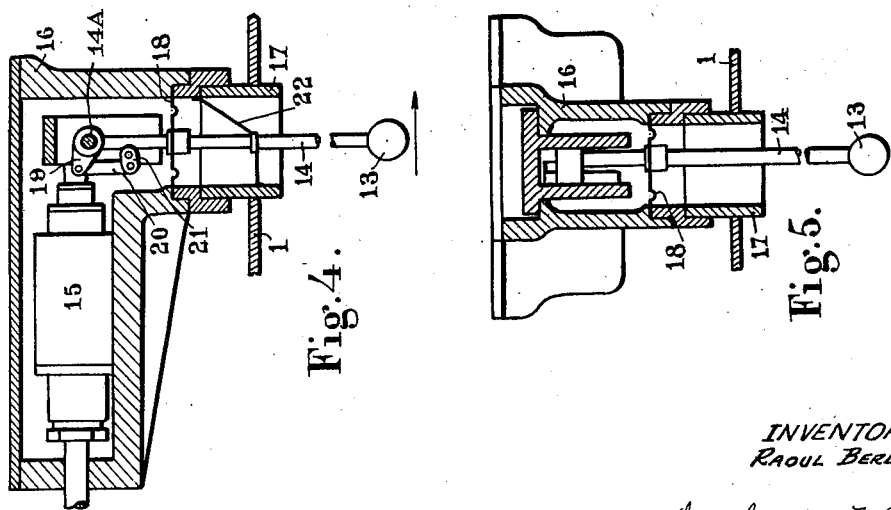

July 16, 1957  R. BERLINE  2,799,397
PRESSURE FILTERS
Filed Dec. 23, 1953  3 Sheets-Sheet 3
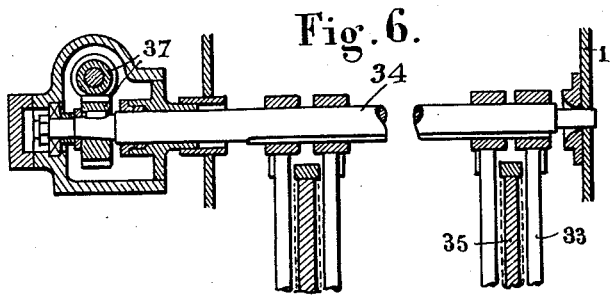
Fig. 6.
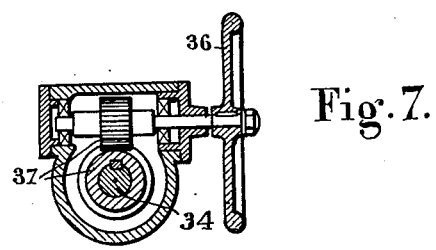
Fig. 7.
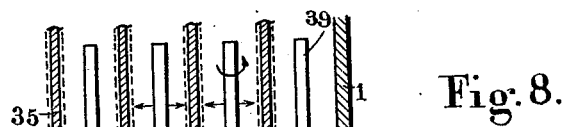
Fig. 8.
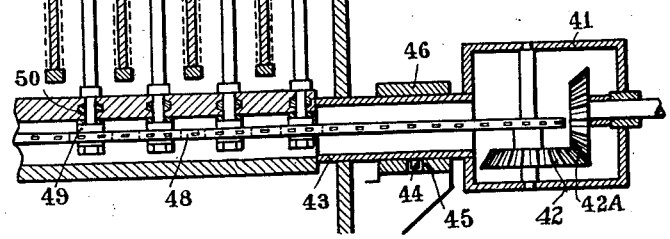
Fig. 9.
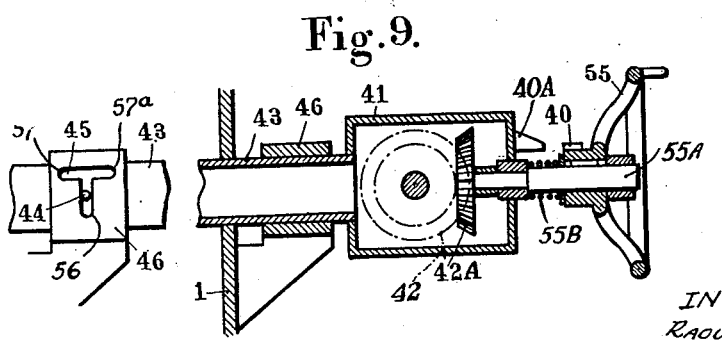
INVENTOR
RAOUL BERLINE
Ostrolenk + Faber
ATTORNEYS United States Patent Office 2,799,397
Patented July 16, 1957

2,799,397

PRESSURE FILTERS

Raoul Berline, Saint-Germain-en-Laye, France

Application December 23, 1953, Serial No. 399,853

Claims priority, application France December 31, 1952

2 Claims. (Cl. 210—331)

The present invention relates to improvements in or relating to apparatus for effecting the filtration of liquids under pressure with a view to cause the solid particles contained in a liquid to form a uniform deposit on filtering elements, to locate during filtration any deterioration of a filtering element in the apparatus and to isolate this element from the operating circuit, to reduce as much as possible on the one hand the amount of washing liquid required for removing the mother liquors and on the other hand the time required for this washing step, and finally to secure at the end of the filtering operation the cleaning of the filter through simple operations, and the quick replacement of damaged filtering elements if any.

The apparatus according to this invention comprises a cylindrical chamber in which the liquid to be filtered is delivered under pressure and forced through filtering disks mounted on a hollow rotary shaft and consisting of a plurality of angular segments, each angular segment being adapted to deliver filtrate into a circular or partly circular groove, the groove or groove fraction communicating with a discharge tube located within the hollow shaft and provided, at the end thereof which projects from the shaft, with an outlet control cock and a transparent outlet tube portion through which light rays are caused to pass for the purpose of locating any turbid liquid delivered to the tube, so that the cock controlling this specific tube may be turned off to bypass the filtering segments supplying this tube, in case one or more filtering segments were damaged.

Other features and advantages of this invention will become apparent as the following description proceeds with reference to the attached drawings and illustrating diagrammatically by way of example one form of embodiment of the invention. In the drawings:

Figure 1 is a longitudinal section of the apparatus shown in diagrammatical form.

Figure 2 is a cross section taken upon the line II—II of Fig. 1.

Figure 3 is an enlarged cross-sectional view of a filtering disk illustrating the structure thereof.

Figures 4 and 5 show in part-sectional views a warning device indicating the maximum thickness attained by the sedimentary cakes.

Figures 6 and 7 are other sectional detail views illustrating a device for actuating the primary sediment scraper pivoting harrow.

Figures 8 and 9 illustrate a device for actuating the harrow of the secondary scrapers or disk final cleaning brushes.

Rotary filtering disks A (Figure 1) are positioned inside a cylindrical casing 1 fed with the liquid to be filtered side a cylindrical casing 1 fed with the liquid to be filtered which is supplied under pressure through an inlet pipe 2.

The filtering disks A consist of a plurality of juxtaposed segments (Fig. 3). Each segment is independent of the adjacent segments and delivers the filtered liquid through a fitting or connector 3 into the hub 4A (Figure 1) which comprises an annular chamber 4 divided into two or more portions. The arcular chamber 4 is then connected to a respective filtrate conducting pipe means of a connecting shaft such as shaft 4c of Figure 1.

Each segment comprises a metal or plastic core. If a metal core member is used it will preferably consist of a sheet metal or wire-netting member 5 having the required rigidity, covered on either side by a wire gauze draining mat 6 supporting an external filtering cloth of adequate textile or metallic composition 7. If the core member is made of plastic material the segments will be formed either with radial and circular grooves or nailheads for supporting the filtering cloth.

A continuous rotary motion is imparted to the set of disks in order to secure the desirable uniformity of thickness of the sedimentary deposits formed on the filtering cloths as the apparatus operates. This motion is produced through self-reducing transmission gears 9A driving a hollow central shaft 10 supported by a pair of bearing-forming gland packing members 11.

The apparatus according to the present invention is equipped with a warning device intended to signal to the operator when the sedimentary deposits have attained the predetermined maximum thickness at which the supply of liquid to be filtered is stopped and the necessary cleaning operation commenced.

This warning device 12 is shown schematically in Fig. 2, and in more detail in Figs. 4 and 5. It comprises a pendulum-mounted metal spherical feeler 13 positioned in the interval between two adjacent disks; the diameter of the sphere is equal to this interval minus the maximum admissible thicknesses of the adjacent pair of sedimentary deposits. When the points positioned at the equator of this sphere engage the outer surface of the sedimentary deposits the latter tend to carry the sphere along and therefore impart an angular motion to the sphere supporting rod 14 about its pivot or spindle 14A. This angular movement of the rod 14 is checked by suitable stops and electric contacts are thus caused to engage each other due to the provision of leverage-multiplying means controlled by the displacement of the rod end.

The sealed casing 16 contains an electrical control switch 15 and a switch operating lever 21. Rod 14 is rotatably mounted on spindle 14A carried in casing 16. A flexible membrane 18 providing the necessary fluid-tight separation between this casing 16 and the socket member welded to the ferrule 17 of the filter. The untreated liquid approaches this membrane to a few millimeters and is isolated therefrom by a cushion of compressed air. The portion situated above this membrane is filled with oil. Due to its incompressibility, oil will balance the internal pressure of the filter to prevent the membrane from bursting. When the sedimentary deposits retained by the filter disks have thickened to a width sufficient to engage the sphere 13 of the warning device, the rod 14 thereof is carried along and its pivotal movement transmitted through a crank arm 19 and a connecting link 20 to the switch operating lever 21. A suitable spring 22 constantly urges the rod 14 to its vertical or radial position.

The liquid to be treated supplied through the inlet pipe 2, or the washing liquid supplied through the same means, is forced through a conduit 23 located longitudinally in the vicinity of the lower generatrix of the cylindrical casing 1 of the filtering apparatus; this conduit 23 is provided with a longitudinal slot designed to regularly distribute the liquid throughout the length of the set of filtering disks.

If the deposits must be washed to remove the residual mother liquors, the cylindrical casing 1 may be drained completely and the untreated liquid replaced by a washing liquid supplied from a pipe and forced through the disks by means of a pump 24 in the same fashion as for the liquid to be filtered in the filtration process. To accelerate the draining of residual liquid, on the one hand, and keep the deposits adherent to the disks in order to avoid their scaling off therefrom on the other hand, compressed air may be introduced into the casing through a piping 25 (Figure 1—lower right side).

During this blowing of compressed air into the casing 1 the filtrate discharge cocks 26 (near the top of Figure 1) are kept slightly open so that the deposits will be backed by atmospheric pressure and the residual filtrate allowed to drain. During this operation the set of disks are rotated for draining the filtrate from the segment pockets, in order to:

(1) Avoid any tendency of the filtrate to pass through the cloth in the direction opposite to the direction of filtration, due to its own weight, when the supply of air is interrupted, which would cause deposit fractions to separate and mix up with the unfiltered residual liquor still present in the casing;

(2) Scoop one portion of this untreated liquid and filter it as the draining operation proceeds; it will be noted that this draining operation is more efficient when open-work segments are used, as in the case of sheet-metal or wire-gauze core segments.

The supply of washing liquid from a pipe 27 is controlled by a three-way cock 28.

Another method of washing sedimentary deposits consists of draining as usual the excess of untreated liquid by opening the discharge aperture 31, rotating the disk assembly at a faster rate than during the normal filtration, for instance at 10 R. P. M. instead of 1 R. P. M., and introducing the washing liquid in jet form both through the nozzles 30 of the washing row 29 to be described presently and through the supply pipe 2, so that the friction action of the liquid will cause the deposits to scale off. This operation may be facilitated by the provision of fin means (not shown) for directing the washing liquid which are positioned on the peripheral edges of the disks. Then the apparatus is again operated as a filter by forcing supplemental washing liquid by means of the pump 24. The washing liquid containing the residual mother liquor is collected at the outlets of tubes 51 and the solid particles are again deposited on the disks to form new deposits thereon which are completely freed from mother liquors.

After the washing operation, if the latter is required, the deposit-forming substance is extracted and evacuated.

For this purpose various devices, all made in accordance with the teachings of this invention, may be used, according to specific conditions. One of these devices consists of a washing row 29 located beneath the upper generatrix of the cylindrical casing and provided with spray nozzles 30 arranged to direct jets of liquid against the rotating disks so as to "scale" the deposits therefrom. The resulting sludge falls to the bottom of the casing and is driven therefrom towards the draining aperture 31 by a rotary screw or spiral conveyor 32. This screw conveyor is driven either from the same prime mover as that actuating the set of disks or from a separate motor.

If it is desired to collect the sediment in dry form, collapsible curved scrapers 33 (Figure 2) may be used. To operate these scrapers they are displaced towards the axis of the apparatus. A pair of scrapers 33 disposed on each side of each disk A act simultaneously on both faces of the disk as the disk assembly is rotated. These scrapers are secured at one end on a common shaft 34 mounted for rotation about an axis parallel and adjacent to one generatrix of the cylindrical chamber 1 and normally to the planes of the disks A; this shaft 34 is rotatably driven from a hand-wheel 36 (Fig. 7) mounted externally of the filter assembly and operatively connected to the shaft 34 through a reducing gear 37 which may be of the worm type, as shown.

The curvature of the scrapers 33 is of the same radius as the disks A so that when inoperative the scrapers 33 may be retracted to a position parallel and adjacent to the inner wall of the cylindrical chamber 1 and outside the intervals between adjacent disks by actuating the hand-wheel 36, to avoid any interference with the deposit formation during the filtering operation.

These scrapers have a substantially helical surface and may be replaced in case of wear without dismantling the whole apparatus, by releasing bolts through lateral inspection doors 38.

As the scrapers cannot be brought into engagement with the filtering cloths without causing the cloths to deteriorate a gap is provided between the plane of rotation of the scraper edge and the associated disk. As this gap remains filled with sediment the cleaning operation may be completed by using the nozzle washing device 30 to remove the small residual amount of sediment and completely clean the cloths. It is also possible for removing this residual sediment to use cylindrical brushes 39 consisting of metal wires or nylon filaments mounted on rectilinear rotatably mounted spindles. These brushes will completely clean the cloth surfaces without damaging them and their mounting may be such as to make their replacement extremely easy. To reduce the number of brushes, a single brush may be provided for cleaning two adjacent faces of a pair of adjacent disks.

These brushes 39 are radially mounted in a common radial plane on a shaft 43 extending longitudinally in the cylindrical chamber 1 normally and adjacent to the outer peripheral edges of the disk A; this shaft 43 has an outer portion through which it is mounted in light frictional engagement in a bearing sleeve 46 secured to the outer wall of the cylindrical chamber 1. The rotational and longitudinal sliding movements of the shaft are guided by means of a stud 44 secured on and projecting from the said outer portion of the shaft, this stud 44 engaging a T-shaped groove 45 formed in the bore of sleeve 46; this groove comprises a transverse section extending from one end 56 thereof along the curvature of sleeve 46 and opening intermediate the ends 57, 57a of a longitudinal section along a generatrix of the sleeve 46. When the stud 44 engages the end 56 of the transverse section of the groove, the brushes 39 are in their retracted or inoperative positions, i. e. outside the intervals separating the disks A and in engagement with the inner wall of the cylindrical chamber 1. The shaft 43 is hollow and has mounted therein the two sides of a chain 48 engaging a plurality of driving pinions keyed on the separate shafts of the brushes 39; the outer portion of shaft 43 has secured thereon a gear casing 41 which rotates with shaft 43. Pinion 42 which controls chain 48 is mounted in the casing 41. Bevel gear 42A which meshes with and drives pinion 42 is also mounted on the casing by shaft 55A which may be rotated by hand-wheel 55 outside the casing 41. When the hand-wheel 55 is pushed axially against the resistance of compression spring 55B towards the gear casing 41, a projection 40 carried by the hand-wheel hub engages a notched stop 40A projecting from the gear casing 41 so that the hand-wheel 55 will rotate the shaft 43 together with the casing 41 and will also rotate the brushes 39 radially mounted on this shaft 43. The brushes 39 may be moved from their inoperative positions to their operative positions against the associated surface of each disk A by pushing or pulling the hand-wheel 55 until the stud 44 engages one or the other end 37 of the longitudinal section of the T-shaped groove. The brushing operation is then effected by rotating the hand-wheel 55 without pushing same towards the casing 41.

The third motion is obtained through the bicycle type chain 48 engaging corresponding sprockets 49 fast with brush spindle extensions positioned within the tubular extension 43. For this purpose a bearing member 50, for example of graphite, may be provided in each bore formed in the tubular extension 43 for receiving the brush spindle extensions.

When the filtering apparatus is used with a pre-clogging adjuvant substance such as diatomite, it is possible to form therewith a layer thick enough to avoid spoiling this alluvium with the scrapers, so that the original layer may be re-used for several successive runs.

The cake particles or lumps scaled from the disks fall to the bottom of the cylindrical casing and are conveyed therefrom to the outside by the Archimedean screw 32 as already explained.

The cylindrical casing may be heat-insulated to avoid or minimize heat losses. It may also be provided with an inner jacket through which a heating or cooling medium may be circulated.

With the devices according to the invention idle periods as those required for repairs in case of tearing of the filtering medium are substantially reduced. Each disk or each pair of homologous half-disks, or each group of homologous juxtaposed segments, for instance in the case of an eight-segment disk a series of four groups of juxtaposed segments belonging to four different disks are connected to a separate filtrate outlet tube 51. Externally of the hollow shaft 10 these tubes are provided with a transparent element 52 generally of Pyrex glass, to permit a ready inspection of the operation of each disk or half-disk or group of half-disks, or groups of homologous disk segments.

An inspection hole or a photo-electric cell control apparatus 53 enables the operator to check whether the filtrate flowing from a tube is cloudy, in which case he can turn off the corresponding cock 26, thereby isolating the set of segments corresponding to this tube. At the end of a run, after the apparatus has been cleaned, the lateral inspection doors 38 provided in the cylindrical casing, which correspond to the filtering elements to be controlled, are opened, and the various segments corresponding to the tube having delivered the doubtful filtrate are checked by rotating the hollow shaft as required by means of a treadle controlling the driving motor. Once a faulty segment has been located it is unbolted and replaced by a fully-dressed segment, this entire operation being a matter of only a few minutes. The operator of the machine is warned by a sound and/or light signal, when the filtrate delivered by one of the elements or groups of elements becomes cloudy or turbid, so that he need not keep a constant watch on the transparent outlet tubes.

This warning system may consist of a tubular bulb 54 such as an infra-red or other type of lamp disposed in the axis of the cylindrical bundle of filtrate outlet tubes.

When the turbid liquid or the solid particles flowing therein intercept the light rays from this lamp, a circuit connected to a photo-electric cell is closed and an optical and/or sound signal is operated.

What I claim is:

1. An apparatus for filtering a liquid under pressure, comprising a cylindrical chamber to which the liquid to be filtered is delivered, a hollow shaft mounted in, and adapted to rotate about the axis of, said cylindrical chamber; filtering disks mounted on, and rotatably driven from, said hollow shaft; each of said disks consisting of a hub rigidly mounted on said hollow shaft and having formed therein a plurality of separate arcuate channels disposed in succession around said hollow shaft; a plurality of coplanar filtering segments rigidly secured about said hub, an outlet fitting on each segment, each outlet fitting causing the associated filtering segment to communicate with one of said arcuate channels in said hub, a plurality of pipes for discharging the filtered liquid, said pipes extending longitudinally within said hollow shaft, each of said pipes being respectively connected to one of said arcuate channels, each of said pipes being spaced from the internal circumference of said hollow shaft each of said pipes being adapted to discharge the filtered liquid from one of said arcuate channels of the hub of one of said filtering disks.

2. An apparatus for filtering a liquid under pressure comprising a cylindrical chamber fed with the liquid to be filtered, a hollow shaft coaxial with and mounted for rotation in said cylindrical chamber; filtering disks mounted at spaced intervals on and driven for rotation from said hollow shaft; each disk consisting of a hub rigidly secured on said hollow shaft and formed with a plurality of separate arcuate channels concentric with the shaft axis and arranged in succession around said hollow shaft; a plurality of filtering segments rigidly secured on said hub and juxtaposed in co-planar relationship normally to said shaft axis; an outlet fitting on each of said filtering segments, each outlet fitting enabling the associated filtering segment to communicate with one of said arcuate channels in said hub, a pluraltiy of pipes for discharging the filtered liquid and being respectively connected to one of said arcuate channels; said pipes extending longitudinally within and spaced from the outer circumference of said hollow shaft, each of said discharge pipes collecting and discharging the filtered liquid from certain arcuate channels of the hubs of one series of filtering disks each of said discharge pipes having a respective valve means associated therewith for selectively turning off liquid flow therethrough.

References Cited in the file of this patent

UNITED STATES PATENTS

| | | |
|---|---|---|
| 1,219,796 | Atkins et al. | Mar. 20, 1917 |
| 1,227,983 | Vallez | May 29, 1917 |
| 1,313,929 | Sweetland | Aug. 26, 1919 |
| 1,323,421 | Sweetland | Dec. 2, 1919 |
| 1,350,433 | Atkins et al. | Aug. 24, 1920 |
| 1,793,289 | Naugle | Feb. 17, 1931 |
| 1,835,796 | McCaskell | Dec. 8, 1931 |
| 1,964,326 | McNamara et al. | June 26, 1934 |
| 2,084,753 | Watson et al. | June 22, 1937 |
| 2,207,618 | Grill et al. | July 9, 1940 |
| 2,351,652 | Anderson | June 20, 1944 |
| 2,358,338 | Lilja et al. | Sept. 19, 1944 |
| 2,408,977 | Gebauer | Oct. 8, 1946 |
| 2,576,288 | Fink et al. | Nov. 27, 1951 |

FOREIGN PATENTS

| | | |
|---|---|---|
| 49,247 | Germany | Oct. 24, 1889 |
| 542,517 | Germany | Jan. 25, 1932 |